United States Patent
Bawolek et al.

(10) Patent No.: US 6,424,392 B1
(45) Date of Patent: Jul. 23, 2002

(54) LIQUID CRYSTAL COLOR FILTER WITH INTEGRATED INFRARED BLOCKING

(75) Inventors: Edward J. Bawolek, Chandler; Gregory W. Starr, Tempe; Zong-Fu Li, Gilbert, all of AZ (US)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 09/708,999

(22) Filed: Nov. 8, 2000

Related U.S. Application Data

(62) Division of application No. 09/164,202, filed on Sep. 30, 1998, now Pat. No. 6,208,393.

(51) Int. Cl.[7] .................. G02F 1/1335; C09K 19/02; C09K 19/52
(52) U.S. Cl. .................. 349/106; 349/97; 349/104; 349/182; 252/299.01
(58) Field of Search .................. 349/97, 80, 104, 349/106, 182; 252/299.01

(56) References Cited

U.S. PATENT DOCUMENTS

| | | | | |
|---|---|---|---|---|
| 4,416,514 A | * | 11/1983 | Plummer | 349/80 |
| 4,758,818 A | * | 7/1988 | Vatne | 340/701 |
| 4,965,242 A | * | 10/1990 | DeBoer et al. | 156/235 |
| 5,280,373 A | * | 1/1994 | Ozawa et al. | 349/113 |
| 5,615,032 A | * | 3/1997 | Kalamanash et al. | 349/165 |
| 5,689,317 A | * | 11/1997 | Miller | 349/80 |
| 6,355,386 B1 | * | 3/2002 | Helber et al. | 252/299.4 |

* cited by examiner

Primary Examiner—William L. Sikes
Assistant Examiner—Tarifur R. Chowdhury
(74) Attorney, Agent, or Firm—Trop, Pruner & Hu, P.C.

(57) ABSTRACT

A liquid crystal color filter may include an infrared blocking dye integrated within the filter to prevent infrared radiation from adversely affecting the performance of the filter when used in an imaging system. The dye may be incorporated into a liquid crystal element in the filter or may be coated on components thereof. Suitable dyes are transmissive of light in the visible range and substantially absorbent of light in the infrared range from approximately 800 nm to 1200 nm in wavelength.

8 Claims, 2 Drawing Sheets

LIQUID CRYSTAL COLOR FILTER WITH INTEGRATED INFRARED BLOCKING

This is a divisional of prior application Ser. No. 09/164,202 filed Sep. 30, 1998 now U.S. Pat. No. 6,208,393.

BACKGROUND

This invention relates generally to imaging systems which may be used, for example, in connection with digital cameras, scanners, and the like.

Imaging sensors based on silicon technology typically use an infrared blocking element in the optical chain. The purpose of this infrared blocking element is to prevent infrared radiation from entering the imaging array.

Silicon-based devices are typically sensitive to light with wavelengths up to about 1200 nm. If the infrared is permitted to enter the array, the array responds to the infrared, and generates an output image signal. Since one purpose of an imaging system is to create a representation of visible light, the infrared produces a false response is and distorts the image produced by the imaging system. In monochrome (black and white) imaging systems, the result can be an obviously distorted rendition. For example, foliage and human skin tones may appear unusually light. In a color imaging system, the introduction of infrared distorts the coloration and produces an image with incorrect color.

Liquid crystal color filters may be used to produce a switchable shutter made up of a pair of serially arranged filters. These filters are electronically switchable because they include an electronically controllable liquid crystal element. By electrically controlling the polarization of the liquid crystal element, the light which is transmitted through the filter may be controlled.

In this way, a given wavelength band may be transmitted through a given filter. In effect, the liquid crystal color filter may be tuned to a particular color. The liquid crystal color filters may be tuned to a pair of colors and through color combination, may produce a third color. Thus, a liquid crystal color filter may form a switchable shutter which can controllably produce red, green, and blue primary color bands or complementary color bands such as cyan, magenta and yellow.

Switchable shutters are commercially available. One commercially switchable shutter is the KALA switchable shutter produced by ColorLink, Inc., Boulder, Colo. 80301. A tunable color filter which may be used as one of the filters of a switchable shutter is described in U.S. Pat. No. 5,689,317 issued to Miller.

Switchable shutters may be used in color imaging systems to provide electronically switched color planes. In this way each image sensor can selectively be exposed to a particular color plane at one instance and then at sequential instances be exposed to successive color planes. Individual sensors are not necessary for each color plane but instead a single set of sensors may be used to sense each color plane in successive time intervals.

Thus, while switchable shutters and liquid crystal color filters offer important advantages, there is a continuing need for improved systems which may make these shutters and/or filters more advantageous in connection with digital imaging systems.

SUMMARY

In accordance with one embodiment, a liquid crystal color filter includes a liquid crystal filter element that passes light in the visible spectrum. An infrared filter absorbs. infrared light and passes light in the visible spectrum. The infrared filter is incorporated into the liquid crystal filter element.

DETAILED DESCRIPTION

Figure 1:
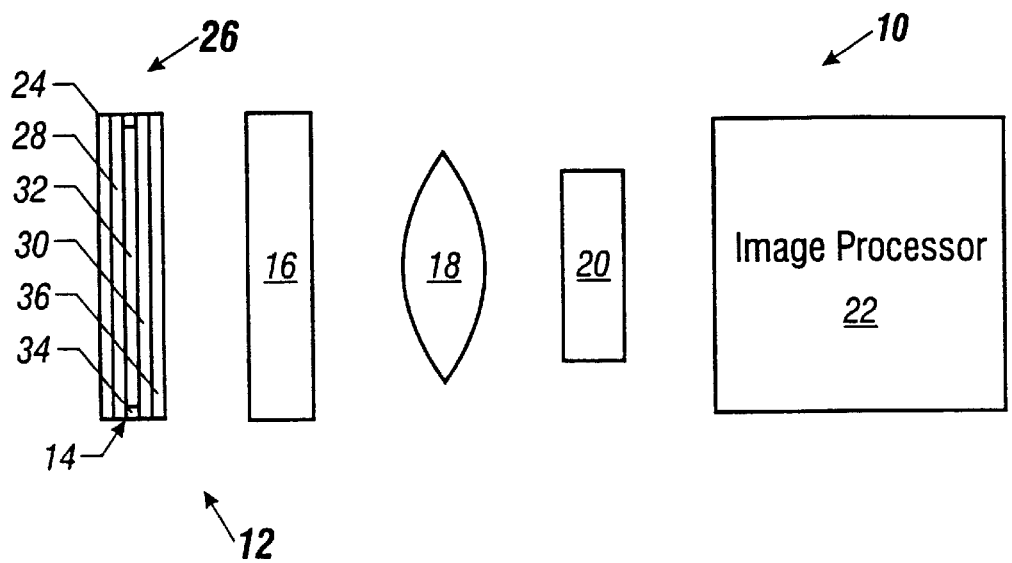
FIG. 1 is a schematic depiction of an imaging system using a liquid crystal filter in a switchable shutter system.

Referring to FIG. 1, an imaging system 10 which may be used for example in connection with a digital camera, a scanner, or similar devices, includes a switchable shutter 12 which sequentially passes each of a plurality of color planes such as the red, green and blue color planes. The switchable shutter 12 is tunable to produce a variety of different colors and may be used in known color systems including the red, green, blue (RGB), and the cyan, magenta, yellow (CMY) system.

In general, when an appropriate electrical signal is applied to the switchable shutter 12, it is tuned to pass a particular color plane. Therefore, the shutter 12 may be sequentially tuned to pass each of three conventional color planes which may then be detected by an image sensor 20. An image sensor 20 may be a complementary metal oxide semiconductor (CMOS) image sensor which uses either an active pixel sensor (APS), a passive pixel sensor (PPS) system or other known techniques. Alternatively, a charge coupled device (CCD) sensor may be used.

The switchable shutter 12 provides electronically alterable transmission'spectra in different color bands. One exemplary switchable color shutter is a KALA filter available from ColorLink, Inc. of Boulder, Colo. 80301. The shutter 12 is synchronously switched to successively provide color information in each of the desired bands. The KALA filter switches between an additive primary color (RGB) and a complementary subtractive primary color (CMY). Input white light is converted to orthogonally polarized complementary colors.

The color shutter is electronically switchable between transmission spectra centered in each of a plurality of additive color planes such as the red, green and blue (RGB) primary color planes. The color shutter may be sequentially switched to provide three color planes that are combined to create a three color representation of an image.

The use of color shutters in imaging systems may advantageously allow each pixel image sensor to successively respond to each of three color bands. Otherwise, separate pixel image sensors must be interspersed in the array for each of the necessary color bands. Then, the missing information for each pixel site, for the remaining two color planes, is deduced using interpolation techniques. With the color shutter, every pixel can detect each of three color bands, which should increase color definition without interpolation.

A conventional lens system 18 is provided between the imaging sensor 20 and the switchable shutter 12. The imaging sensor 20 communicates with a conventional image processor 22 in a known fashion.

Advantageously, the switchable shutter 12 is made up of a pair of liquid crystal color filters 14 and 16. For example, the filter 14 may provide a blue/yellow stage while the filter 16 may provide a red/cyan stage. The color shutter 12 then may selectively provide three additive primary color bands as well as a black state.

Each filter 14 or 16 may be composed of three elements. The element 24 may be a neutral linear polarizer. Neutral linear polarizers are commercially available from a variety of companies including Polaroid Corporation of Cambridge, Mass. Behind the polarizer 24 may be a liquid crystal 26. Behind the liquid crystal 26 may be a color selective polarizer 36. The color selective polarizer 36 may be made of a dyed oriented polyvinyl alcohol (PVA) material. These devices are known in the art.

The liquid crystal 26 may include a pair of a glass substrates 28 and 30 which may, for example, be made of borosilicate glass. A liquid crystal material 32 may then be contained between the layers of substrate 28 and 30 as defined by the spacers 34.

A suitable infrared blocking dye is incorporated into one or both of the filters 14 and 16. For example, the dye may be coated on the layers 24 or 36 or on the substrates 28 and 30. The dye may also be included within the liquid crystal 32. The dye is chosen to be transmissive of light in the visible spectrum and absorptive of light in the infrared spectrum. In this way, the dye effectively blocks infrared radiation without significantly reducing the transmission of visible spectrum light through the shutter 12. Alternatively, an optical interference coating that blocks IR may be coated on one surface or one or more of the layers 24, 28, 30 or 36.

Figure 2:
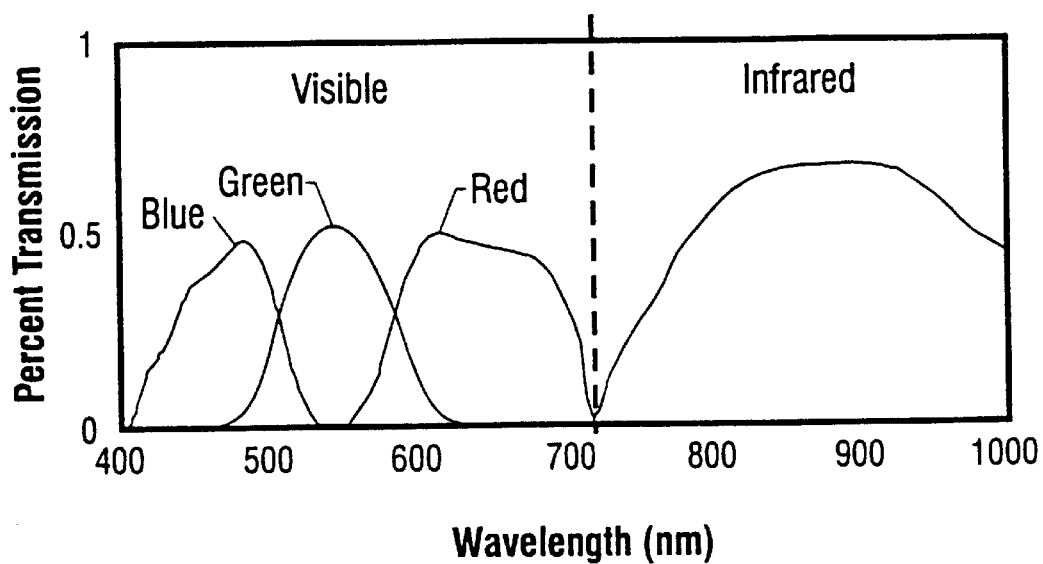
FIG. 2 is an idealized graph of percent of transmission versus wavelength for the switchable shutter shown in FIG. 1.

Referring to FIG. 2, light in the visible spectrum, with wavelengths from approximately 400 to 700 nm, is transmitted through the shutter 12 depending on the particular wavelength color band to which it is tuned. The transmittance of blue, green and red components in an idealized embodiment is illustrated. After the visible spectrum, whose boundary is marked in dashed lines in FIG. 2, the infrared spectrum extends upwardly from about 700 nm. The imaging system 10 may be sensitive to infrared up to at least 1200 nm.

Thus, in accordance with an embodiment of the present invention, the infrared component may be absorbed by the dye while passing the visible component. This avoids inadvertent spurious detection of the infrared component which may have the adverse effects described previously.

Figure 3:
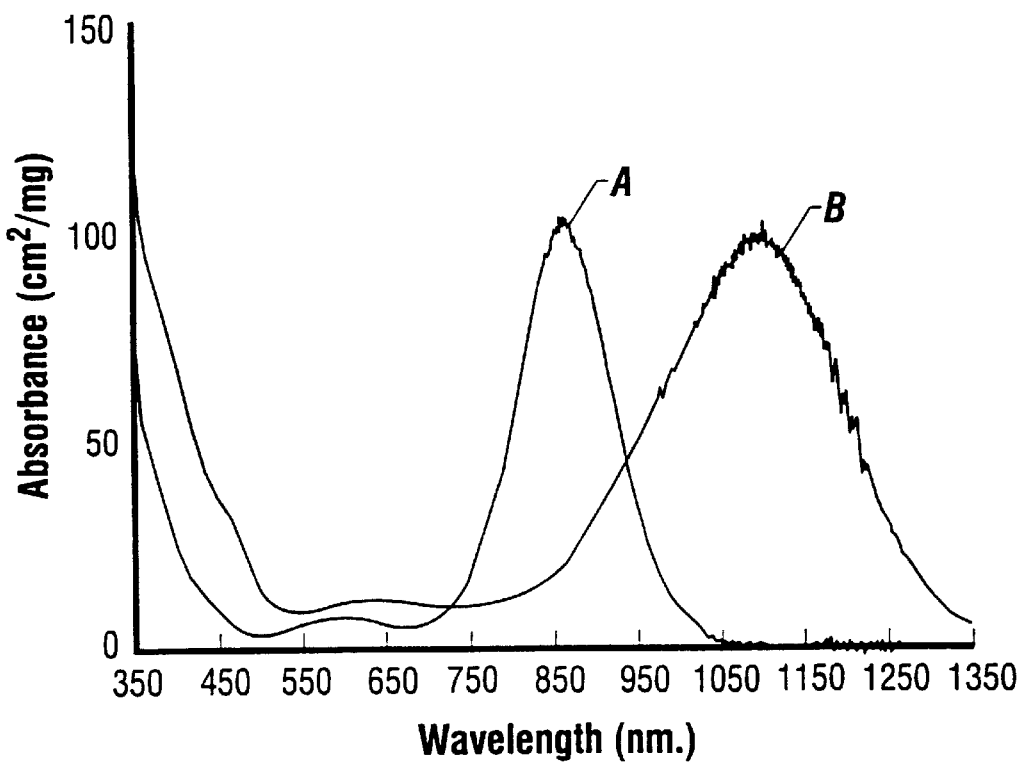
FIG. 3 is an absorbance in square centimeters per milligram versus wavelength in nanometers for a pair of dyes that may be used in connection with the embodiment shown in FIG. 1.

One exemplary combination of. infrared blocking dyes may have the absorbance characteristics shown in FIG. 3. Namely the illustrated dyes have absorbance of grater than 50 cm.$^2$/mg. in the band from about 800 to about 1200 nm. This range may substantially correspond to that infrared transmission region to which an imaging system 10 may be sensitive. In addition the dyes may have an absorbance of less than 50 cm.$^2$/mg between 500 and approximately 700 nm. By absorbing the infrared components in one range while passing visible light components in another range, an effective infrared blocking system can be implemented which does not degrade the color transmittance of the switchable shutter 12.

The dye "A" may be mixed in equal parts with the dye "B" to create an improved infrared blocking dye. This dye may then be coated on the components as described previously, or included within the liquid crystal 32. Advantageously, the combined dye is ionically inert so as not to adversely affect the operation of the shutter 12.

The dyes illustrated in FIG. 3 are dyes which are commercially available from Nippon Kankoh-Shikiso Kenkyusho Company, Ltd. of Japan, Nos. NK#113 which is bis (dithiobenzil) nickel complex having the following structure:

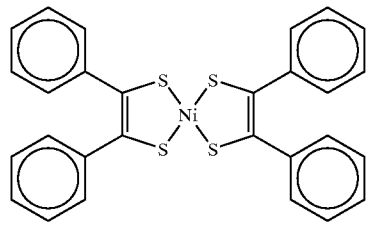

and NK#114 which is bis((4-dimethylamino) dithiobenzil) nickel complex having the following structure:

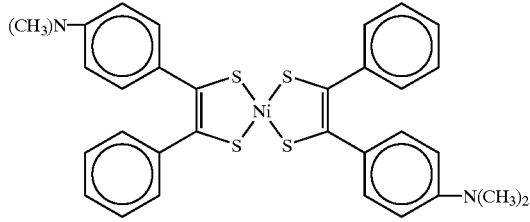

The peak absorption of dye A (which is NK#113) is about 840 nm. which is substantially at the infrared transmittance peak of-the shutter 12, as illustrated in FIG. 2. The dye B extends the infrared absorption capability of the combination to about 1250 nm.

Figure 4:
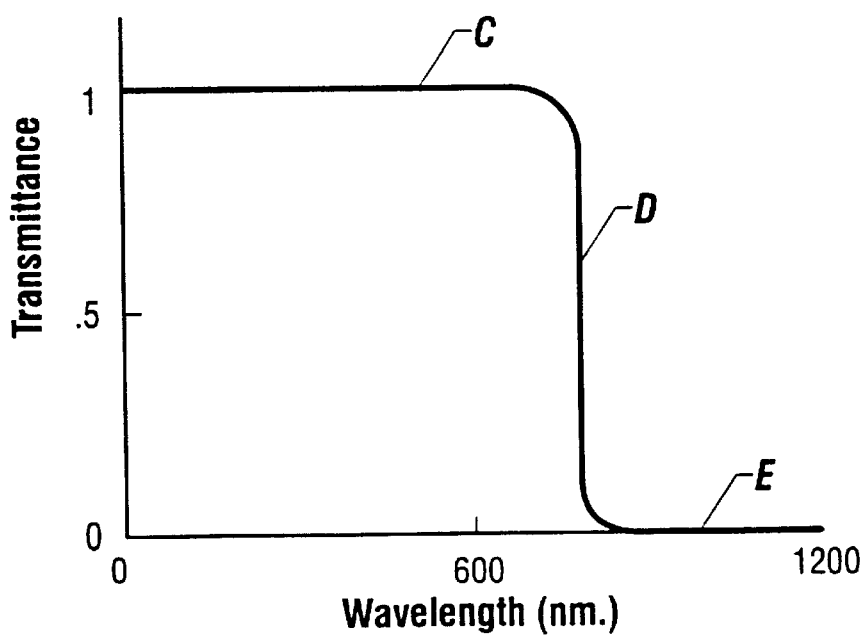
FIG. 4 is an idealized graph of transmittance versus wavelength in nanometers with an infrared blocking dye integrated into the switchable shutter shown in FIG. 1.

Referring to FIG. 4, the idealized transmittance characteristics of an infrared blocking dye for embodiments of the present invention is illustrated. Ideally, the dyes have 100% transmittance up to about 700 nm, and substantially no transmittance thereafter. The illustrated dyes shown in FIG. 3 approximate this model.

Other suitable infrared blocking dyes include anthraquinone or dihydrodiketo anthracene dyes. These dyes may be included in the liquid crystal element. The anthraquinone dyes are non-ionic and include the following;

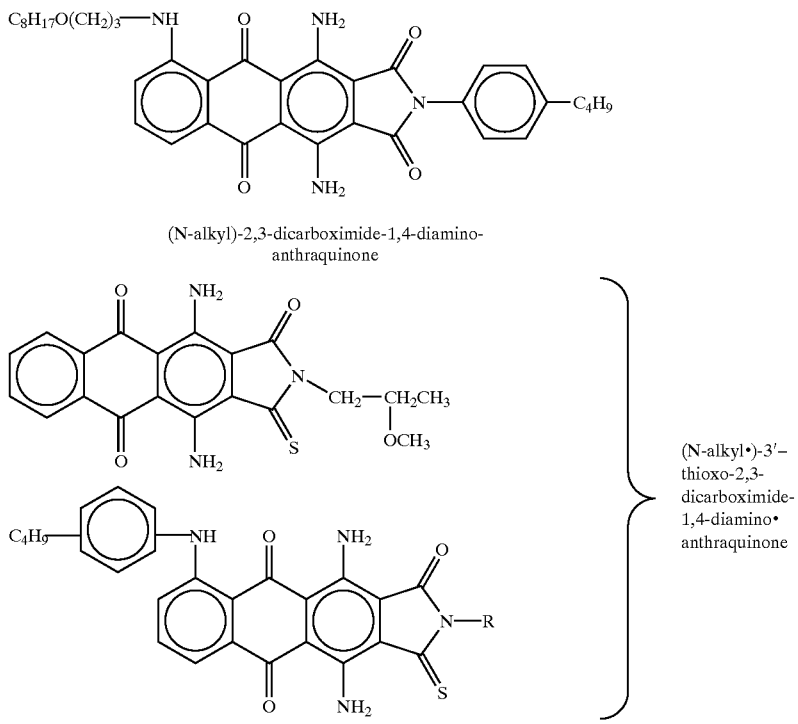

which have absorption peaks of 705, 750 and 810 nm respectively.

In addition the infrared absorbing dyes may be covalently bonded to the liquid crystal ligand. Other reactive combinations with the liquid crystal may be used as well. Alternative, simple admixtures and suspensions may also be suitable.

Thus, an infrared blocking dye integrated into a liquid crystal color filter may achieve substantial blocking of infrared radiation while allowing substantial amounts of visible light to pass unaffected by the dye. In this way, an external infrared blocking element is not necessary.

In one embodiment, the layers 24 or 36 or the substrates 28 or 30 may be chemically-doped or ionically-colored glass. The layers 24, 26, 28 or 30 may be doped with an ionic colorant, having infrared blocking ability such as for example copper oxide (CuO).

Processes to make IR selective ionically-colored glass are known. These glasses are generally formed by way of a conventional melting process. In one known process, the chemical dopant responsible for creating the ionic coloration, i.e., a colorant such as for example copper oxide (CuO), is combined in a melting process with a component responsible for forming a matrix to support the colorant, such as phosphorous pentoxide ($P_2O_5$), and silicate, borosilicate, or soda-lime glass and other components to form the ionically-cblored glass. In one embodiment, a suitable ionically-colored glass is a CM-500™ glass distributed by Hoya Optics of 'Fremont, Calif., made of the following weight percents: more than 51% $P_2O_5$, 11–20% aluminum oxide, 1–10% lithium oxide, and 1–10% copper oxide. In another embodiment, a suitable ionically-colored glass is BG 39™ distributed by Schott Glass Technologies of Duryea, Pa., made of boron oxide, barium oxide, sodium oxide, potassium oxide, calcium oxide, aluminum oxide, arsenic trioxide, lithium oxide, phosphorous oxide, cerium oxide, and copper oxide.

Ionically-colored glass is potentially more susceptible to interaction with and attack by moisture and other elements than borosilicate or soda lime glass. This interaction and attack can degrade the surface polish through hydrolization and potentially disrupt the adhesion between the glass and the organic material used to seal the glass to the layers 24, 36, 28 or 30. One approach to stabilizing the surface of ionically-colored glass, is to overcoat the element with silicon dioxide ($SiO_2$) or other transparent refractory metal oxides, such as titanium oxide ($TiO_2$), by conventional sputtering or evaporation. A coating on the order of, for example, 20–50 Å is sufficient to protect the seal and prevent moisture from penetrating the surface and interacting with the chemical dopants, for example, CuO in the element.

A second approach of protecting the ionically-colored g'lass from the deleterious effects encountered in the environment, particularly moisture, is to coat the element with a chemical stabilizer. A useful chemical stabilizer is available in the form of adhesion promoters that are used in the integrated circuit wafer fabrication industry as a method for improving the adhesion of photoresist on substrate films. Examples of adhesion promoters include hexamethyldisilizane (HMDS), trimethylsilylacetamide, diethylaminonitrimethylsilane, glycidoxypropyltrimethoxysilane, 3-aminopropyltriethoxysilane, and N-(2-aminoethyl)-3-amino-propyltrimethoxysilane.

The adhesion promoter HMDS, for example, is believed to improve adhesion by chemically reacting on the wafer surface to form a thin monolayer of essentially pure $SiO_2$. This film bonds effectively to the substrate and provides a suitable surface for good resist adhesion. The reaction may be represented as follows:

$$2[Si_s-OH]+(CH_3)_3Si-N(H)-Si(CH_3)_3 \rightarrow 2[Si_s-O-Si(CH_3)_3]+NH_3$$

where "$Si_s$" represents a silicon atom resident in the substrate surface.

According to one embodiment, ionically-colored glass, that has a component of phosphorous, such as glass doped with ionic colorant CuO, reacts with an adhesion promoter, such as HMDS, to surface treat the glass from exposure to environmental effects such as moisture by forming a thin layer, e.g., 20–50 Å, of $SiO_2$-like material on the surface of the glass. More specifically, the adhesion promoter material reacts to form a siloxane bond with the $SiO_2$ surface, with an organic moiety turned outwards.

One advantage to the adhesion promoter approach over sputtering or evaporating to surface treat an ionically-colored element is that it can be carried out in simple, lower cost equipment. Examples include, but are not limited to, glass chambers at atmospheric pressure with a small quantity, approximately 30–50 milliliters, of HMDS liquid as a vapor source, vacuum prime ovens that combine baking (to drive off moisture) with the introduction of HMDS vapor at sub-atmospheric pressure to provide the surface treatment. An example of the treatment in a vacuum prime oven includes baking the substrate in dry nitrogen (100° C., 760–10 Torr, 15 min.) and exposing the substrate to HMDS vapor in vacuum (100° C., 10 Torr, 2 min.), and then pumping/purging the system with dry nitrogen (100° C., 10–760 Torr, 15 min.). The treatment produces a 20–50 Å thick chemical stabilizer layer over the surface of the glass.

A second advantage to the adhesion promoter approach is that it is compatible with high cleanliness processing. Surface treatment with HMDS, for example, produces virtually no added defects. Sputtering and evaporation with $SiO_2$ or other transparent refractory metal oxide requires that the equipment be specially designed and carefully operated and maintained to ensure low-defect'surfaces.

For a discussion of adhesion promoter treatments in integrated circuit processing, reference is made to Mittal, K. L., "Factors Affecting Adhesion of Lithographic Materials," Solid State Technology, May 1979, at 88–96, Helbert, J. N. & Saha, N., "Application of Silanes for Promoting Resistant Patterning Layer Adhesion in Semiconductor Manufacturing," J. Adhesion Sci. Tech., Vol. 5, No. 10, at 905–25 (1991), and Bourtram, M. E., Howard, A. J., Baca, A. G., Shul, R. J., & Rieger, D. J., "A New Method for Promoting Photoresist Adhesion on Tungsten Films for Self-Aligned Refractory Grates on GaAs," J. Electrochem. Soc., Vol. 140, No. 10, at 2998–3000 (Oct. 1993).

In another embodiment, the layers 24 or 36 or 28 or 30 may be coated instead of using an ionically-colored element. Many chemicals for use as a coating material for glass elements are known. The majority of conventional coating materials are manufactured using the following "inorganic" evaporation chemicals: titanium dioxide ($TiO_2$), silicon dioxide ($SiO_2$), silicon oxide (SiO), magnesium oxide (MgO), and tantalum pentoxide ($Ta_2O_5$). Coatings manufactured from these materials are highly resistant to damage from abrasion, humidity, corrosive chemicals and solvents, and solar radiation when applied under proper process conditions. These conditions typically include high temperature, i.e., greater than 200° C., high vacuum free of residual hydrocarbon gases and water vapor, precision substrate penetration, including glow discharge, and reactive gas enriched deposition to form hard coatings.

There are a number of methods of forming IR light selective hard coating elements including, but not limited to, deposition, evaporation, and lamination. Representative methods are presented below.

One method of forming IR light selective hard coating elements is through an electron-beam evaporation process. In the electron-beam evaporation process, the coating chemical is heated to an evaporation temperature by bombardment with a beam of accelerated electrons. In addition to the high degree of control over the evaporation of the coating chemical, the electron-beam evaporation process provides the ability to achieve extremely high evaporation temperatures.

Another method of forming IR light selective hard coating elements is ion-assisted deposition (IAD). The IAD process utilizes conventional hard coating processes wherein conventionally deposited films are coated over the element, such as glass, and arrive at the element with relatively low energy (approximately 1 eV). This low energy level is considered to be a primary contributor to the formation of columnar, porous crystal structures. The principal function of the IAD process is to bombard the coating material with accelerated ions in an effort to densify the coating. To form the coated element, an element coated with the appropriate material is placed in a coating chamber where the element is exposed to an electrically-charged argon or oxygen gas plasma. When energized, a plasma of high energy particles (approximately 120 eV) flows at the element. As the accelerated ions collide with the coating material which has arrived at the element, the coating material is compacted creating a much denser film structure. Film packing densities of 95% can be achieved using the IAD process compared to a relatively porous., columnar crystal structure exhibited by conventional deposit of the coating material. The packing density constitutes an increase of approximately 15% over the typical density achieved using conventional evaporation processes.

Another method of forming coated IR light selective hard coating elements is through an ion plating process. Ion plating is based upon the principle of electromagnetic attraction. This principle is utilized to achieve uniform, up to 100% dense film layers. Instead of using high kinetic energy to pack coating particles as in the IAD process, the ion plating process relies upon the establishment of electromagnetic attraction of coating particles to the element, such as glass, to form a dense film.

In the ion plating process, a chemically coated element is placed in a chamber equipped with a low-voltage, high-current plasma source which is used to direct a high-current argon plasma at an electron-beam evaporation source. Coating particles become positively charged by the plasma at the point of evaporation. The chamber is designed to allow the formation of a negative electrical charge on the element during processing. The electromagnetic attraction induced by the oppositely charged coating particles and element provide the necessary acceleration to achieve a uniform film with up to 100% film packing density on the substrate.

The processes described above for forming IR light selective hard-coated elements are known in the industry. Reference is made to the processes developed by Corion Corporation, including the STABILIFE™ ion-plating process.

The coated element or filter may be made up of a coating of a single material or a series of coatings of the same or different materials depending on the desired light selectivity requirements. Balzers Thin Films of Golden, Colo. offers several suitable IR light selective hard-coated glass elements, including products marketed under the trade names IRB-1™, IRB-2™, IRB-3™, and Cal-Flex™.

The hard coating materials and processes discussed above relate primarily to "inorganic" themical coatings (e.g., $TiO_2$, $SiO_2$, MgO, $Ta_2O_5$, etc.). Organic compounds, compounds having organic characteristics, or polymers are also contemplated.

The embodiments described-above are typically incorporated into or with a glass (e.g., silicon, borosilicate, soda lime, etc.) or glass-like element. Another type of IR selective element contemplated by the invention is a plastic element. In one embodiment, a plastic substrate is made of a plastic colored with dye, such as an organic dye, that is selective to IR light.

One method of forming an IR light selective plastic element is through infection molding. IR dyes of the type contemplated by the invention are typically supplied in powder form. Thus, the IR dye(s) is/are combined with plastic resins that themselves are typically supplied in pellet form. Methods of mixing include two-roll mills or a Banbury mixer. After mixing, the combined material is injected through a conventional injection molding device.

Another method of forming an IR selective plastic element is by casting. In this technique, a plastic monomer such as methyl methacrylate monomer, is cast into a sheet and polymerized.

A third way of forming the IR selective plastic elements is by dip coating. In this technique, the IR dye is mixed with a polymer such as poly(methyl methacrylate) or polycarbonate(s). An element that may be plastic, glass, or other suitable element, is dipped into a solvent system and withdrawn slowly at a controlled speed. The solvent system can contain one solvent or a mixture of solvents with fast, medium, and slow evaporation rates that provide a smooth and even coating. In one embodiment, the viscosity of the solvent system is in the range of 30–100 mPa-sec. The coated element is then heated to approximately 160° C. in the case of a polycarbonate element and 120° C. in the case of a poly(methyl methacrylate) element for thirty minutes to remove the solvent.

While the present invention has been described with respect to a limited number of embodiments, those skilled the art will appreciate numerous modifications and variations. It is intended that the appended claims cover all such modifications or variations which fall within the true spirit and scope of the present invention.

What is claimed is:

1. A digital imager comprising:
   a pair of liquid crystal filters tunable to different wavelengths of light in the visible spectrum; and
   a dye incorporated into said liquid crystal filter, said dye having an absorbance of less than about 50 $cm.^2/mg.$ from about 500 to about 700 nm. and an absorbance of greater than 50 $cm.^2/mg.$ from about 800 to about 1200 nm.

2. The imager of claim 1 wherein said imager also includes an imaging array and an image processor.

3. The imager of claim 1 wherein said dye is coated on one of said filters.

4. The imager of claim 1 wherein said dye is incorporated in a liquid crystal contained in one of said filters.

5. The imager of claim 1 wherein said dye includes anthraquinone.

6. The imager of claim 1 wherein said dye includes a mixture of two dyes which block infrared over a wider wavelength range than either of said dyes individually.

7. The imager of claim 1 wherein said dye includes a bis (dithiobenzil) nickel complex.

8. The imager of claim 7 wherein said dyes include a mixture of bis((4-dimethylamino) dithiobenzil) nickel complex and bis(dithiobenzil) nickel complex.

* * * * *